US 8,096,512 B2
Jan. 17, 2012

(12) United States Patent
Russell (10) Patent No.: US 8,096,512 B2
(45) Date of Patent: Jan. 17, 2012

(54) PAYLOAD MODULES

(75) Inventor: Adrian G Russell, Arlesey (GB)

(73) Assignee: Astrium Limited, Stevenage, Hertfordshire (GB)

( * ) Notice: Subject to any disclaimer, the term of this patent is extended or adjusted under 35 U.S.C. 154(b) by 23 days.

(21) Appl. No.: 12/457,729

(22) Filed: Jun. 19, 2009

(65) Prior Publication Data

US 2010/0019093 A1 Jan. 28, 2010

Related U.S. Application Data

(63) Continuation of application No. 10/531,060, filed as application No. PCT/GB2005/000522 on Feb. 15, 2005, now abandoned.

(30) Foreign Application Priority Data

Feb. 19, 2004 (EP) ..................................... 04250886
Feb. 19, 2004 (GB) .................................. 0403710.7

(51) Int. Cl.
*B64G 1/50* (2006.01)
*B64G 1/22* (2006.01)

(52) U.S. Cl. ................................. 244/159.4; 244/171.8

(58) Field of Classification Search ............... 244/159.4, 244/171.8, 172.7, 173.3; 165/168
See application file for complete search history.

(56) References Cited

U.S. PATENT DOCUMENTS

| | | | |
|---|---|---|---|
| 4,298,178 A | 11/1981 | Hujsak | |
| 4,880,050 A * | 11/1989 | Nakamura et al. | 165/41 |
| 5,152,482 A | 10/1992 | Perkins et al. | |
| 5,314,146 A | 5/1994 | Chicoine et al. | |
| 5,337,980 A | 8/1994 | Homer et al. | |
| 5,344,104 A * | 9/1994 | Homer et al. | 244/158.1 |
| 5,351,746 A | 10/1994 | Mackey et al. | 165/41 |
| 5,518,209 A * | 5/1996 | Chicoine et al. | 244/159.4 |
| 5,699,982 A | 12/1997 | Daugherty | |
| 5,806,803 A * | 9/1998 | Watts | 244/171.8 |
| 5,839,696 A | 11/1998 | Caplin et al. | 244/159.4 |
| 5,950,965 A | 9/1999 | Epstein et al. | 244/159.4 |
| 5,975,464 A | 11/1999 | Rutan | |
| 6,003,817 A | 12/1999 | Basuthakur et al. | 244/164 |
| 6,073,888 A | 6/2000 | Gelon et al. | 244/171.8 |
| 6,098,930 A | 8/2000 | Eller et al. | |
| 6,173,923 B1 | 1/2001 | Penera et al. | |
| 6,206,327 B1 | 3/2001 | Benedetti et al. | |
| 6,378,809 B1 * | 4/2002 | Pon | 244/171.8 |
| 6,478,258 B1 | 11/2002 | Yee | |
| 2003/0010041 A1 | 1/2003 | Wessling et al. | |

FOREIGN PATENT DOCUMENTS

DE 198 46 327 C1 3/2000
(Continued)

OTHER PUBLICATIONS

The European Search Report for EP 04 25 0886 completed Aug. 6, 2004.

(Continued)

*Primary Examiner* — Rob Swiatek
(74) *Attorney, Agent, or Firm* — Nixon & Vanderhye P.C.

(57) ABSTRACT

A plurality of sufficient closely-packed functional units which are interconnected to form a non-planar payload module assembly 40. Advantageously, the payload modular structure 40 is compact with few piece parts, has low output losses, and is robust enough for supporting complete payloads with or without reflectors. The payload modular structure has utility in various space-based applications as well as in various terrestrial applications.

15 Claims, 10 Drawing Sheets

| | FOREIGN PATENT DOCUMENTS | | | RU | 2 092 398 C1 | 10/1997 |
|----|---|---|---|---|---|---|
| EP | 0 284 075 | | 9/1988 | | | |
| EP | 0 786 404 | A1 | 7/1997 | | | |
| EP | 0 780 295 | A3 | 11/1998 | | | |
| EP | 1 022 219 | A2 | 7/2000 | | | |
| EP | 1 032 142 | A2 | 8/2000 | | | |
| GB | 2 366 612 | A | 3/2002 | | | |

OTHER PUBLICATIONS

The Patent Office (UK) Search Report for GB0403710.7 dated Jul. 8, 2004.

* cited by examiner

PAYLOAD MODULES

This application is a Continuation of application Ser. No. 10/531,060, filed Jun. 23, 2005 now abandoned, which is the US national phase of international application PCT/GB2005/00522 filed 15 Feb. 2005 which designated the U.S. and claims benefit of GB 0403710.7, dated 19 Feb. 2004, and of EP 04250886.1, dated 19 Feb. 2004, the entire contents of each of which are hereby incorporated by reference.

FIELD OF THE INVENTION

This invention relates to a payload module. In particular, this invention relates to a non-planar payload module that may be used in space applications.

BACKGROUND OF THE INVENTION

The standard current concept for satellite payload configuration is to layout the payload equipment on aluminium sandwich panels. A number of such panels make up an assembly called the Communications Module (CM). Thermal dissipation is typically handled by a combination of locating the dissipative units on (a) north and south facing radiator panels, and (b) internal panels (typically floors) thermally linked to the north and south facing radiators by heat pipes or pumped loops.

The disadvantages of the known current standard are:
the essentially 2-D layout delivered by a flat panel-based configuration, which leads to an inherently long rf harness length and reduced rf efficiency;
costly manufacture and assembly using potted inserts for equipment attachments to composite panels;
the flat panel structure which is reliant on the rest of the spacecraft structure or on an external handling frame to provide out of plane stiffness and overall structural integrity (leading to higher costs because of Service Module (SM)/CM interaction, CM/SM interface complexity and/or complex CM/SM Assembly, Integration and Test (AIT)).

Figure 1:
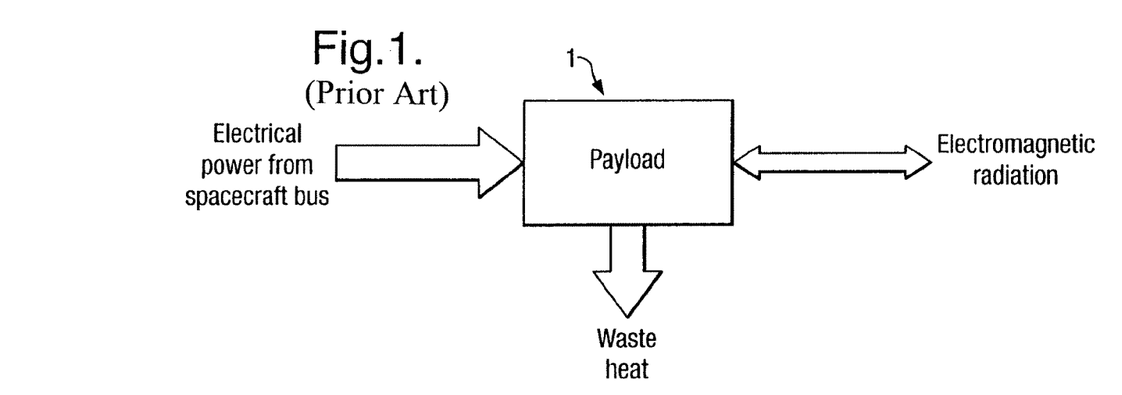
FIG. 1 is a schematic representation of a standard spacecraft payload, showing how it is used to manage the generation of waste heat.

FIG. 1 shows schematically how a standard spacecraft payload 1 is typically used to manage the generation of waste heat. As shown, the payload 1 receives electrical power from its bus and converts the received power into transmission and reception of electromagnetic radiation. Waste heat is generated by the payload 1 during the energy conversion process.

Figure 2:
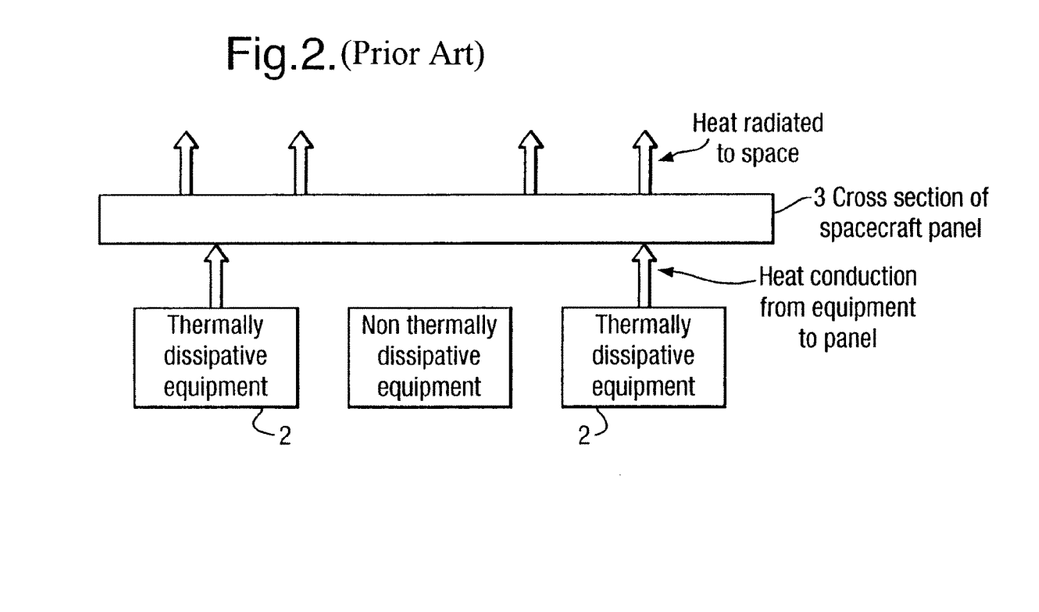
FIG. 2 shows schematically how heat flows typically from payload equipments to panel on a conventional orbiting spacecraft.

FIG. 2 shows schematically how heat flows typically from thermally dissipative payload equipment 2 on a North/South-facing radiator panel 3 of an equatorially-orbiting conventional spacecraft. As shown in the Figure, by way of example, heat is conducted from two thermally dissipative payload equipments 2 to a face of the panel 3, and heat is then radiated from an opposing face of the panel 3 to space. The payload equipments are mechanically attached to the North/South-facing panels, which are the coldest, seeing minimal solar illumination throughout the year. Typically, the panels are between 15 mm and 25 mm thick. The panels are made from composite materials that have a high strength to mass ratio but have poor thermal conductivity. The inclination of the Earth's rotation, relative to its orbital plane around the sun, means that the North and South-facing panels alternately receive a maximum of about 60 W/m$^2$ of solar illumination during the summer and winter seasons.

Figure 3:
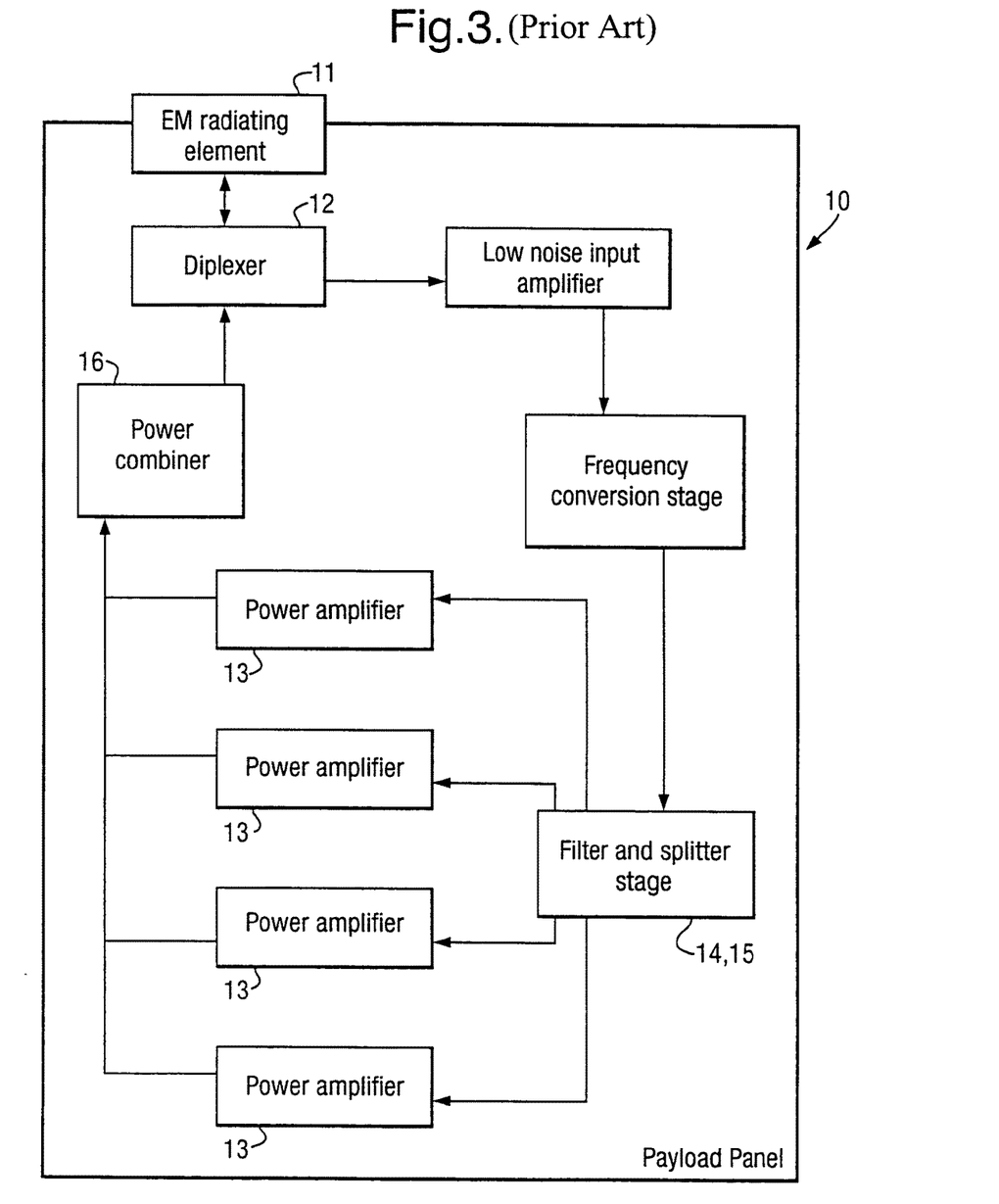
FIG. 3 is a schematic plan view of a standard spacecraft panel layout, showing the typical function and interconnections between equipment.

FIG. 3 is a plan view of a standard spacecraft panel layout 10, showing the typical function and interconnections between equipment. As shown in the Figure, by way of example only, the payload panel configuration has a radiating element 11 with diplexer 12 which in turn is coupled to a combination of power amplifiers 13, filter(s) 14 and splitter(s) 15 and power combiner 16. The power equipments primarily generate thermal dissipation. It is to be understood that the radiator area in use is not fully utilised because the non-thermally dissipating equipments occupy space and because lateral heat flow across the panel is poor. Note also that the panel dimensions are greater than 2 m square, typically, which results in long inefficient connections between the radiating element 11 and the power amplifiers 13.

Figure 4:
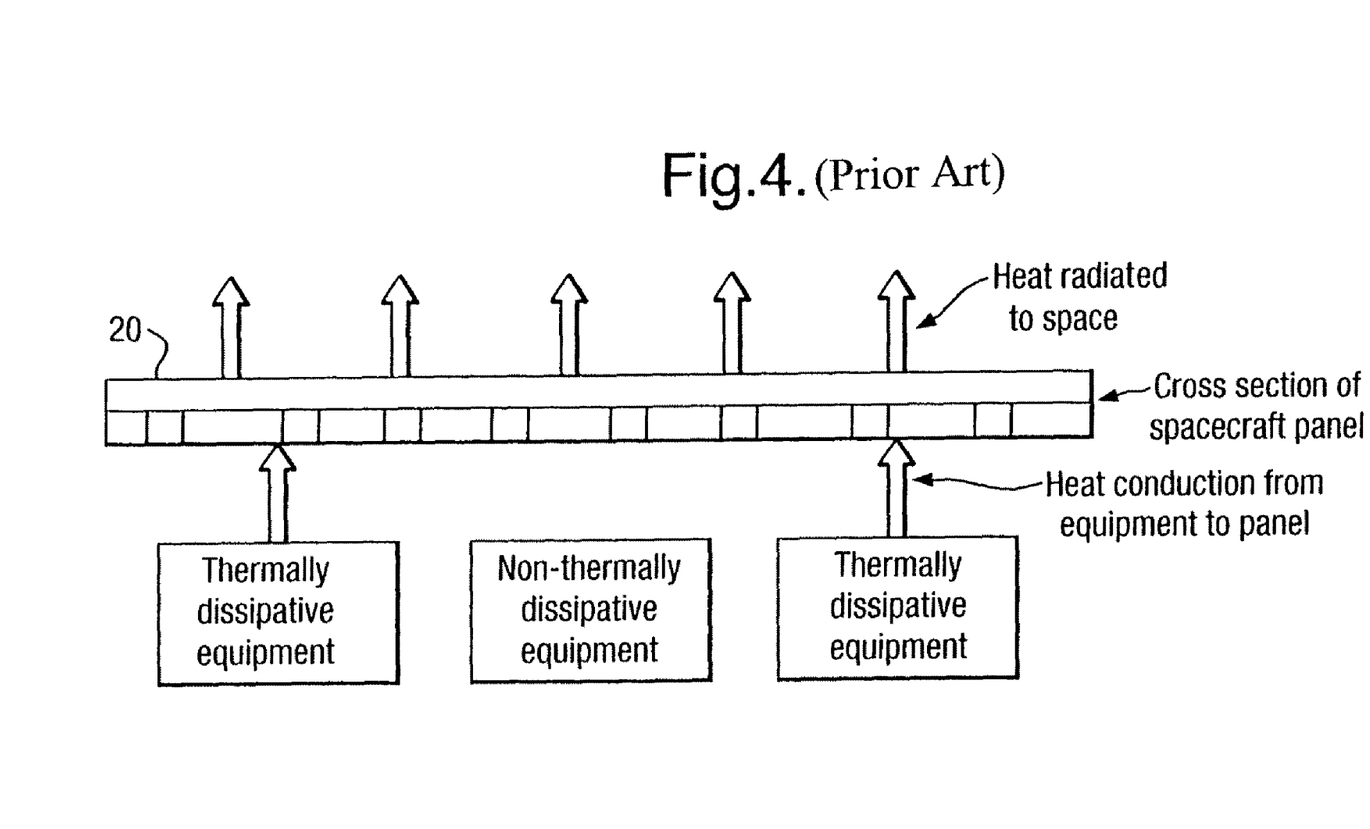
FIG. 4 is a schematic representation of another standard spacecraft panel layout, showing how orthogonal heat pipes are typically embedded within the panel.

FIG. 4 is a schematic representation of another standard spacecraft panel layout 20, showing how orthogonal heat pipes are typically embedded within the panel. In this known arrangement, heat flow across the panel is improved, as compared to that in the FIG. 2 arrangement, permitting full use of the radiator area to be utilised by dissipative equipments. Typically, the heat transport capacity of the embedded pipes is almost ten times better than required.

OBJECTS AND SUMMARY OF THE INVENTION

The present invention aims to overcome or at least substantially reduce some of the above mentioned problems associated with known configurations.

It is a principal object of the present invention to provide a robust, three-dimensional payload modular structure that can effectively support complete payloads with or without reflectors.

It is another principal object of the present invention to provide a three-dimensional self-contained payload module, for spacecraft for example, which can be assembled and/or tested as an independent entity.

It is another principal object of the present invention to provide a compact and simple payload modular structure with few piece parts, low output losses, a high degree of modularity, and a high thermal radiator efficiency.

In broad terms, the present invention resides in the concept of providing a non-planar payload module structure which is configured to support complete payloads comprising sufficient closely-packed mechanical/thermal modules.

Thus, according to a first aspect of the present invention there is provided a plurality of sufficient closely-packed functional units interconnected to form a non-planar payload module.

Further, according to a second aspect of the present invention there is provided a non-planar payload module comprising: a supporting structure for supporting the payload equipment; and a receiving volume for receiving the payload equipment, said volume being defined by the requirement to accommodate a predetermined sufficient closely-packed formation of interconnected functional units.

Further, according to a third aspect of the present invention there is provided a non-planar payload module comprising: a supporting structure for mechanically supporting a number of interconnected functional units; said number of functional units being arranged to provide a sufficient closely-packed modular formation occupying a predetermined volume of the module; a number of thermal radiators positioned remotely in relation to the position of the supporting structure; and means operable to define a thermal pathway between one or more dissipative elements of said module and said number of thermal radiators so that in use dissipated heat is transported from said one or more elements to said number of thermal radiators via the thermal pathway.

In accordance with an exemplary embodiment of the invention which will be described hereinafter in detail, the non-planar payload module is comprised by a faceted tubular body for receiving the constituent functional units. Optionally, the faceted tubular body has an irregular polygonal structure—for example, the faceted tubular body could be octagonal-shaped with eight units arrayed in an irregular octagon around an opening defined by the body, with appropriate structural and equipment attachments. It is to be understood that the faceted tubular body could, in principle, be of any suitable shape and construction that provides facets of sufficient size and number for (a) the functional units plus connecting harness, and for (b) adequate structural support.

Advantageously, the payload module includes feed means for converting electrons into photons or vice versa. Preferably, when the module is comprised by a faceted tubular body, the functional units are mounted at different predetermined locations on a plurality of inner faces of the faceted body and the associated feed locations are mounted in proximate relationship to the functional units at different predetermined locations on corresponding external faces of the faceted body. This arrangement has the advantage of reducing loss in the output harness (amplifiers to feeds) by sufficient close packing of the functional units into the tubular body in close proximity to the feed. Alternatively, if desired, the functional units could be mounted at different predetermined locations on a plurality of external faces of the faceted body and the associated feed locations could be mounted in proximate relationship to the functional units at different predetermined locations on corresponding inner faces of the faceted body.

In accordance with another exemplary embodiment of the invention which will be described hereinafter in detail, the non-planar payload module is comprised by a rack-type mounting chassis. Conveniently, a receiving space is defined by the chassis to accommodate a linear array of functional units, each of the units being slidably mounted on the chassis when in use. This permits a compact modular structure to be provided.

Conveniently, the module includes temperature compensation means such as heat pipes and circuitry which can gather heat dissipated by the functional units and can respond to the output of dissipated heat for adjusting temperature differences in the module.

The present invention also extends to a spacecraft vehicle/satellite incorporating the above described module. As applied to a satellite, this invention proposes an efficient means of managing the waste heat generated by a satellite payload.

Further, the present invention extends to a communications system for airborne use incorporating the above described module.

Further, the present invention extends to a radar communications system incorporating the above described module.

Further, the present invention extends to an optical/quasi-optical system incorporating the above described module.

Further, the present invention extends to a self-contained payload module with external power means and external locating means for location of the module in a desired position.

It is thus to be appreciated that the above described payload module concept offers definite advantage in various respects, namely;

a payload modular configuration that reduces/minimises the loss in the output harness (amplifiers to feeds) by sufficient close-packing of the functional units in the structure, in close proximity to the feed—this means that the inefficiency of the payload is effectively reduced, and in turn can be used to either reduce the size of the amplifiers and power raising and thermal radiation aspects (when applied to a spacecraft/satellite for example) or to increase the performance of the payload;

a payload modular configuration with enhanced modularity between platform and payload, and between payload types;

a payload modular configuration that simplifies the payload mounting structure, reduces the part count, encourages an increased level of standardisation and reduces the overall customisation cost; and a payload modular configuration that permits effective/optimal use of the thermal radiator area by ensuring a full dissipation, for example from either north or south radiator when applied to spacecraft.

It is also to be appreciated that the proposed payload module concept, when applied to spacecraft, offers (a) a robust and compact-sized three dimensional (rather than planar) structure that can support complete payloads except reflectors, (b) remote thermal radiators and (c) a thermal system that gathers the dissipated heat from the payload equipment, maintains any specified differential temperatures between the constituent modular structural units and transports the dissipated heat from the units to the thermal radiators. It is to be understood that the thermal radiators are separated from the modular units and may comprise remote north and south facing radiators. The particular advantage of separating the equipment mounting function of the module from the thermal radiator function is that it permits the modularity and thermal radiator efficiency to be substantially enhanced. The inventors have cleverly taken advantage of this, despite the recognition that separating the equipment mounting function of the module structure from the thermal radiator function has the effect of complicating the thermal path from dissipative units of the module to the radiators.

Conveniently, it is a simple task to implement small, "add-on", or experimental payload modular packages of the above described type in spacecraft, if desired. The payload modular packages can then function as self-contained, piggy-back type packages.

It is to be understood that the proposed module has a simplified, flexible and mechanically robust design and can be easily implemented at reasonable cost in various space-based applications. The proposed module design could equally be used for terrestrial communication applications, if desired.

The above and further features of the invention are set forth with particularity in the appended claims and will be described hereinafter with reference to the accompanying drawings.

DETAILED DESCRIPTION OF PREFERRED EMBODIMENTS

In this specification the term "payload module" will be understood by those skilled in the art to mean or cover an arrangement in which the payload equipment is closely-packed into one, two or more mechanical/thermal packages or modules.

Also, in this specification the term "non-planar" will be used to qualify the dimensionality of the proposed payload module insofar as it is intended to refer to a three dimensional (3-D) module structure (rather than a two dimensional (2-D) planar module structure).

Also, in this specification the term "functional units" will be understood to mean the complete payload equipment or a subset of the payload equipment excluding the mechanical and thermal support components. In this connection, it is to be understood that the term "payload" refers to the collection of equipment, that convert the electricity generated by a bus (typically a spacecraft bus from solar panels) into transmission and reception of electromagnetic radiation. The radiation may contain data for telecommunications or be used directly for ranging as in RADAR/LIDAR applications. It is to be understood that the term "payload" could also refer to collections of equipment that are organised predominantly for the reception only of electromagnetic radiation.

Figure 5:
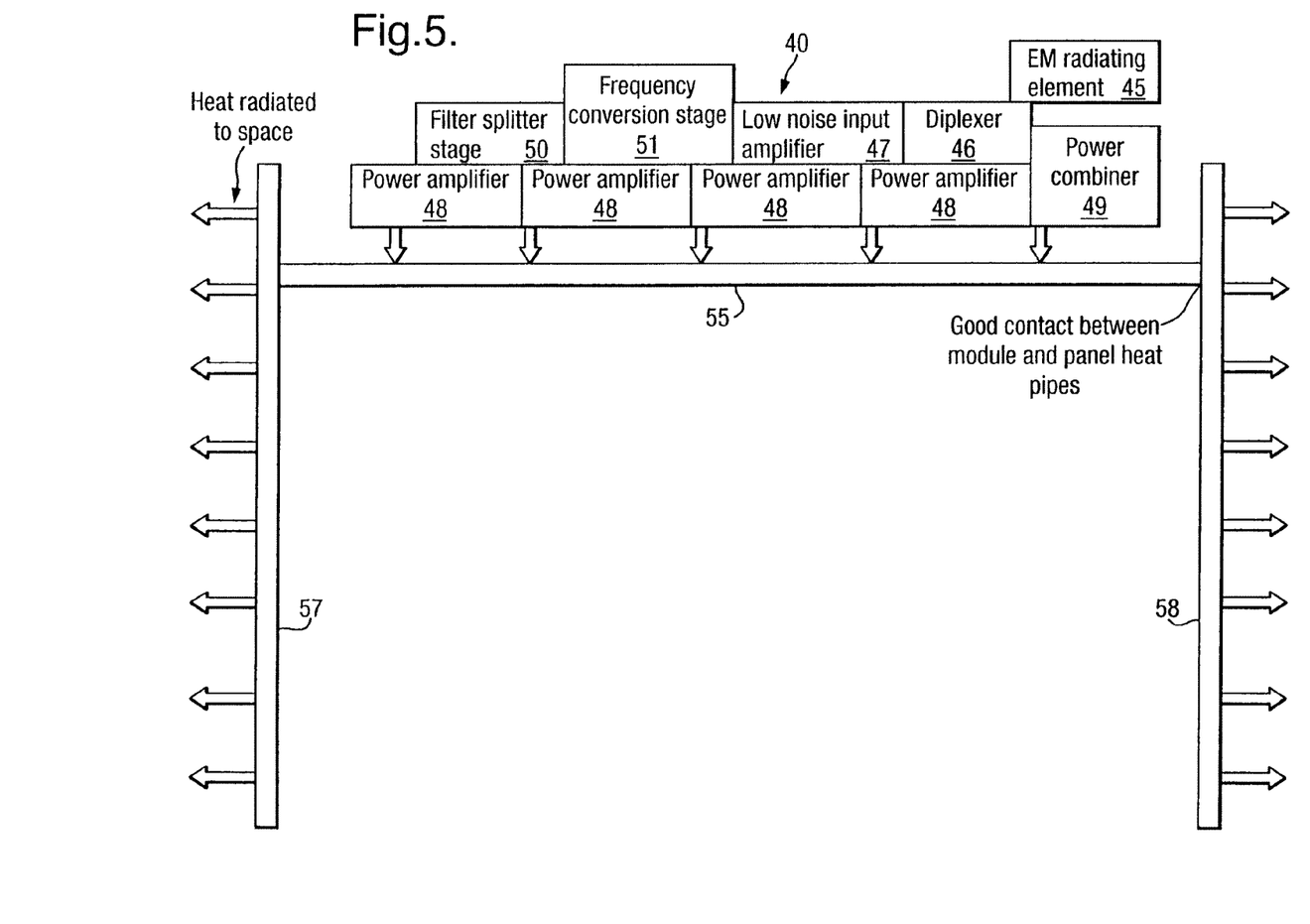
FIG. 5 is a schematic representation of a collection of payload equipments which assemble to provide a payload module embodying the present invention.

Referring now to FIG. 5, there is schematically shown therein a preferred payload module assembly 40 for spacecraft embodying the present invention. The payload module assembly 40, generally indicated as a collection of blocks in FIG. 5, comprises a close-packed collection of payload equipments in the form of an EM radiating element 45, a diplexer 46, a low noise input amplifier 47, a plurality of power amplifiers 48, a power combiner 49, a filter splitter stage 50 and a frequency conversion stage 51. This kind of close packed modular arrangement 40 conveniently permits short efficient connections to be provided between the respective payload equipments.

As shown in FIG. 5, the payload module assembly 40 is connected to heat pipes 55 which are in turn connected to the north/south-facing radiator panels 57, 58 of the spacecraft. In this arrangement, the payload module assembly 40 is positioned remote from the north/south-facing radiators 57, 58.

In operation of the thus described close packed modular arrangement, it will be understood that heat is transported from the thermally-dissipative payload equipments of the module to the heat pipes 55 (as shown) by means of conduction and that the heat is then transported via the heat pipes 55 to the radiator panels 57, 58. As shown, heat is then radiated by the panels out to space. Note that the proposed symmetrical thermal link between north and south-facing radiator panels, as shown, permits solar gain in summer and winter to be efficiently managed.

In this embodiment of the present invention, it will be understood that no mechanical fixing of the payload equipments to the radiator panels is required, removing structural loads and permitting light panels to be used. If desired, a set of parallel heat pipes can be embedded in the panels (not shown).

Figure 6:
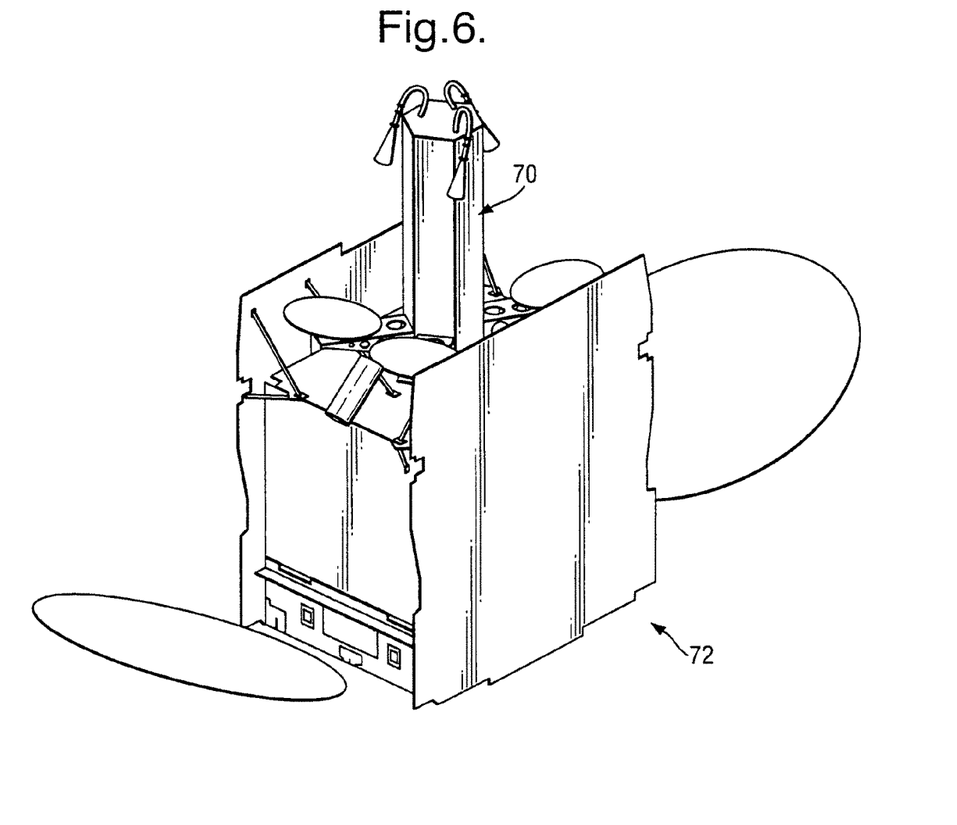
FIG. 6 is a perspective view of a faceted tube structure for add-on or experimental payload modules according to another embodiment of the present invention.

FIG. 6 shows a second embodiment of the present invention in which a regular faceted tube structure 70 for add-on or experimental payload modules is deployed on a conventional satellite 72. In this embodiment, the payload equipments are configured in close-packed fashion (as described previously in relation to the FIG. 5 embodiment) within the faceted tube 70, located on the satellite in a similar fashion to a feed tower. As shown, a plurality of feeds and antenna reflectors are configured on external faces of the tube 70. The functional units are mounted to heatpipes (not shown) aligned along the tube length, on the internal faces of the tube 70. Alternatively, if desired, the functional units could be mounted to heatpipes on external faces of the tube (not shown) and the feeds could be mounted on internal faces of the tube (not shown). Whilst the faceted structure in this embodiment is shown to be a regular hexagonal tube 70, the tube could alternatively be of a different shape and construction that provides facets of sufficient size and number for the functional units plus connecting harness and for adequate structural support. For example only, the faceted tube could instead be a thick skin (typically 4mm) carbon fibre reinforced plastic (CFRP) regular or irregular octagonal tube (not shown), with structural equipment attachments implemented with bolts passing through equipment flanges and the tube laminate into simple nuts.

In operation of the thus described FIG. 6 arrangement, it will be understood that longitudinal heatpipes (not shown) may be used to gather the dissipated heat and ensure small temperature differentials between units on the same facet. Note that the remote radiators (not shown), for what would be a small percentage of the total dissipated heat, could be one or more of a combination of the following: dedicated radiators mounted to the faceted tube, dedicated radiators mounted to the satellite platform or a segment of the satellite Y wall radiators, shared with the main satellite payload. Note also that the proposed method of heat transfer from the tube mounted heatpipes to the remote radiators could be achieved using either: direct connection between the heatpipes and the remote radiators, or indirect connection using a fluid loop.

Figure 7:
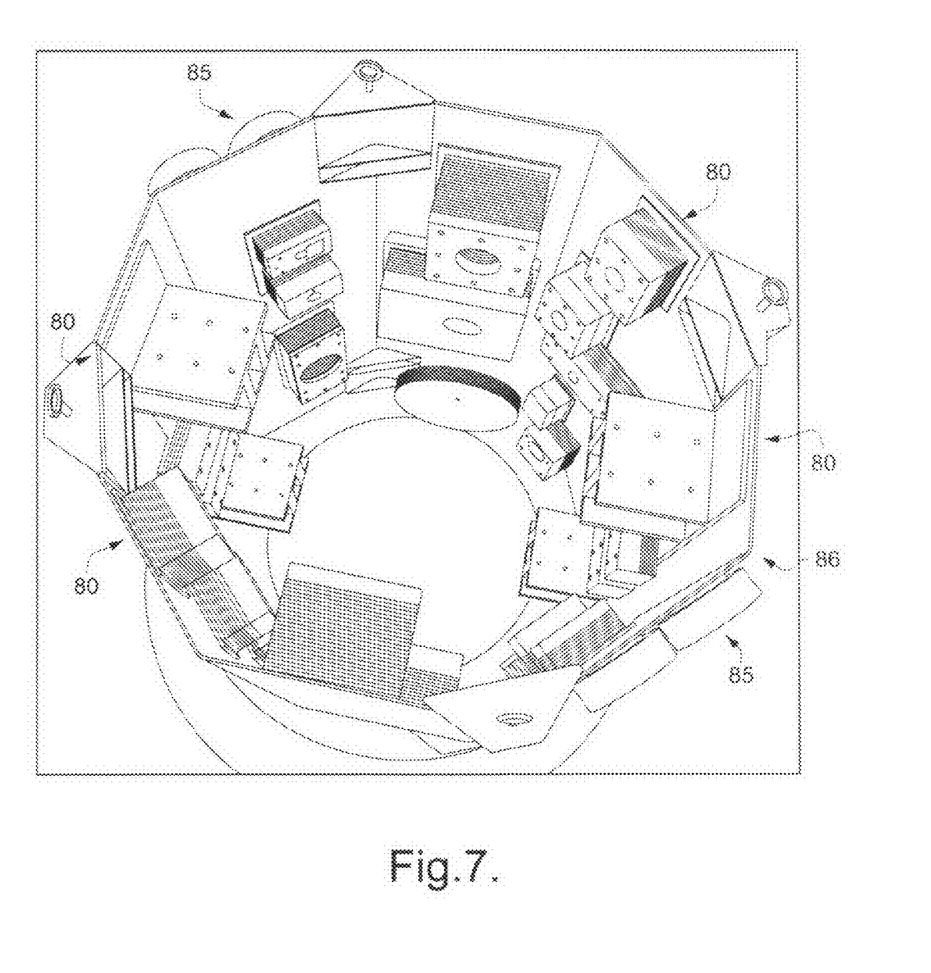
FIG. 7 is a top plan view of a faceted tube payload module with functional units, according to another embodiment of the present invention.

FIG. 7 shows a top plan view of a further embodiment of the present invention in which a complete geostationary satellite payload is configured to provide a plurality of faceted tube payload modules 80.

Each of the faceted tube payload modules 80 is located at a suitable position close to its associated required feed location 85 so as to reduce/minimise rf harness losses, and such that a good payload to platform modularity is effectively implemented. As shown, the associated feeds 85 are suitably configured onto a plurality of external faces of the faceted tube 86.

The functional units are mounted to heatpipes (not shown), aligned along the tube length, on internal faces of the tube. Alternatively, if desired, the functional units could be mounted to heatpipes on external faces of the tube (not shown).

Whilst the faceted structure in this embodiment is shown to be a regular octagonal tube 86, the tube could alternatively be of a different shape and construction that provides facets of sufficient size and number for (a) the functional units plus connecting harness and for (b) adequate structural support. For example only, the faceted tube could instead be a thick skin (4 mm) CFRP heptagonal tube (not shown), with structural and equipment attachments implemented with bolts passing through equipment flanges and the tube laminate into simple nuts.

In operation of the thus described FIG. 7 arrangement, it will be understood that longitudinal heatpipes (not shown) may be used to gather the dissipated heat and ensure small temperature differentials between units on the same facet. The optimal remote radiators (not shown), for what would be nearly 100% of the payload dissipated heat, are dedicated fixed or deployable, thermal radiators facing in the north and south directions. The method of heat transfer from the tube mounted heatpipes to the remote radiators could be achieved using either direct connection between the heatpipes and the remote radiators, or indirect connection using a fluid loop. Note that the more complex and expensive fluid loops could allow the modules to be configured in a wider range of orientations but an adequate configuration can be proposed with the modules located at the level of the feeds, above the platform, oriented so that the longitudinal axis of each tube is parallel to the satellite north/south axis. This configuration permits the heat transfer to be achieved with simple L-shaped heatpipes, with the longer part of the heatpipe bolted to the banks of functional units (within the tube) and the other arm of the L-shaped heatpipe bolted directly to one or other of the north and south radiators.

Figure 8:
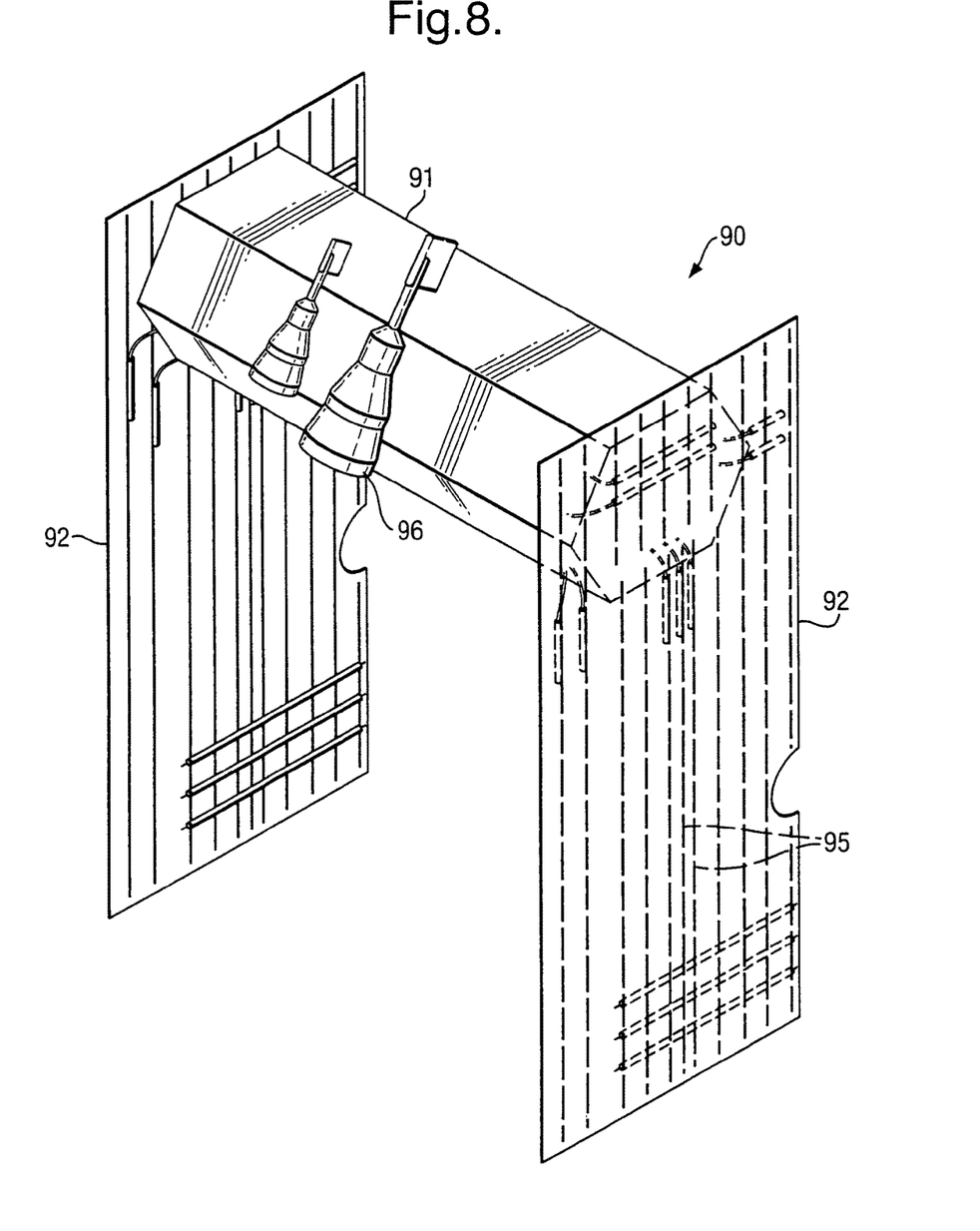
FIG. 8 is a perspective view of a C-band payload module in accordance with another embodiment of the present invention.

Referring next to FIG. 8, there is shown in perspective view a C-band Payload Module 90 for a satellite embodying the present invention. The C-band Payload Module 90 comprises a faceted tube structure 91 of the type described in FIG. 7, a pair of remote thermal radiators 92 facing in the north and south directions, and a connecting network of heatpipes 95 for transferring heat from the faceted tube structure to the remote radiators. As shown, the functional units within the faceted tube structure 91 are located at the level of the feeds 96 above the platform, oriented so that the longitudinal axis of the tubular structure is parallel to the satellite north/south axis. As also shown, the heatpipes are L-shaped, with the longer part of the heatpipe bolted to the banks of the functional units (within the faceted tube) and the other arm of the L-shaped heatpipe bolted directly to one or other of the north and south facing radiators 92. In this way, an efficient heat transfer can be achieved during operation of the payload module 90. It will be understood also that the heatpipes 95 in use serve to gather the dissipated heat and in combination with control circuitry (not shown), ensure small temperature differentials between units on the same facet. Note in this Figure that not all of the facets are shown for clarity.

Figure 9:
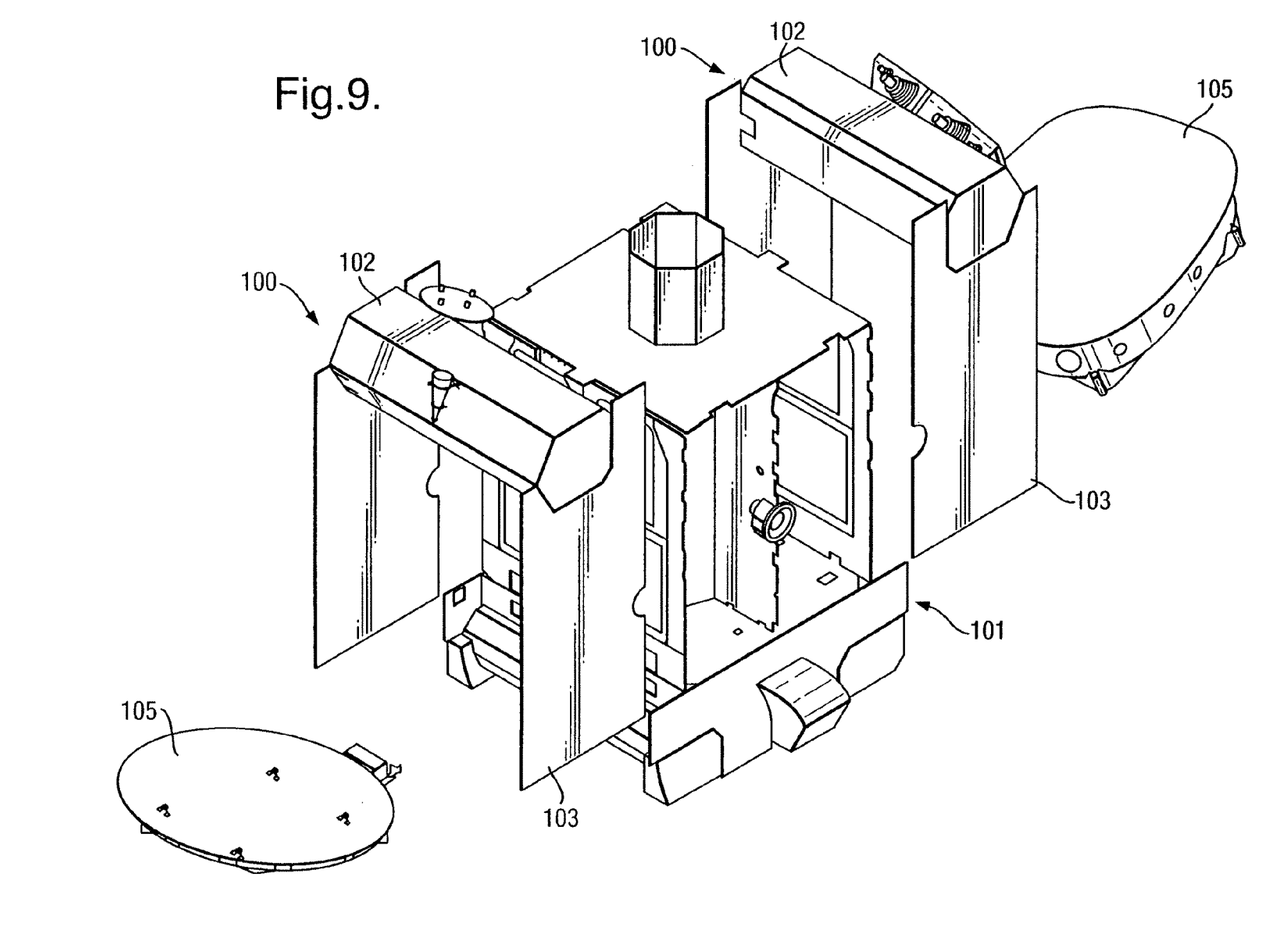
FIG. 9 is a perspective exploded view of two faceted tube payload module structures, as applied to C-band and Ku-band payload on a typical spacecraft platform, in accordance with another embodiment of the present invention.

Referring next to FIG. 9, there is shown in perspective exploded view C-band and Ku-band Payload Modules 100, for a satellite on a typical platform 101, embodying the present invention. In this embodiment, as shown, the C-band and Ku-band Payload Modules 100 each take advantage of a faceted tube structure 102 of the type previously described in FIG. 7. As shown there are two separate faceted tubes and each of the faceted tubes 102 is structurally supported by the platform 101 so as to be positioned directly on top of one or other of the north/south facing radiator panels 103. As also shown, the associated feeds are conveniently mounted close to the faceted tubes 102. For sake of completeness, a plurality of standard reflectors 105 for use with this configuration are additionally shown.

Figure 10A:
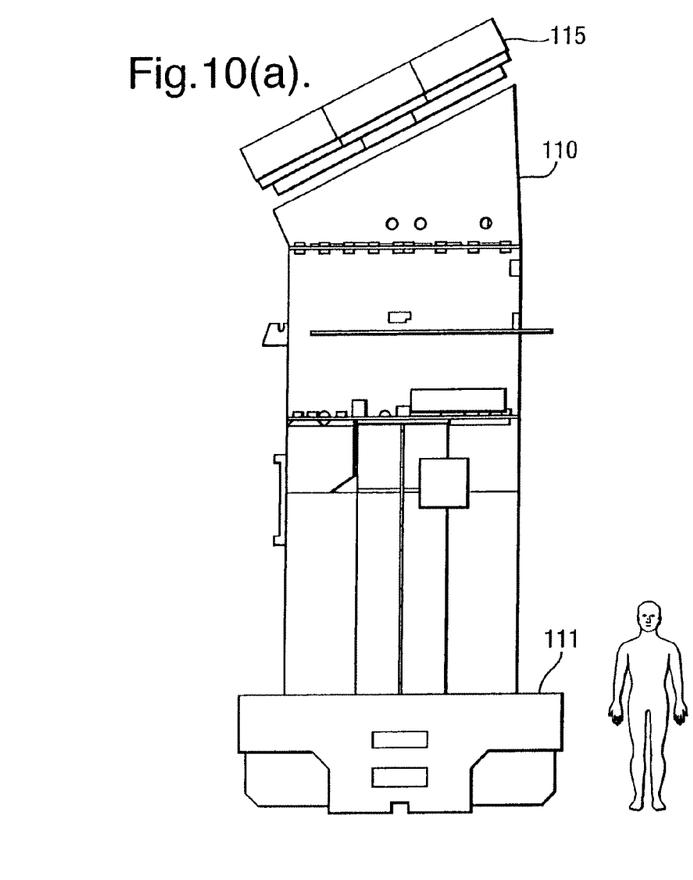
FIGS. 10(a) and 10(b) provide a schematic comparison of two payload configurations as applied to the same space mission, FIG. 10(a) showing a Geo-mobile payload conventionally configured on a typical spacecraft platform, and FIG. 10(b) showing five faceted tube payload modules in accordance with another embodiment of the present invention, these being implemented with the same platform as in FIG. 10(a)
Figure 10B:
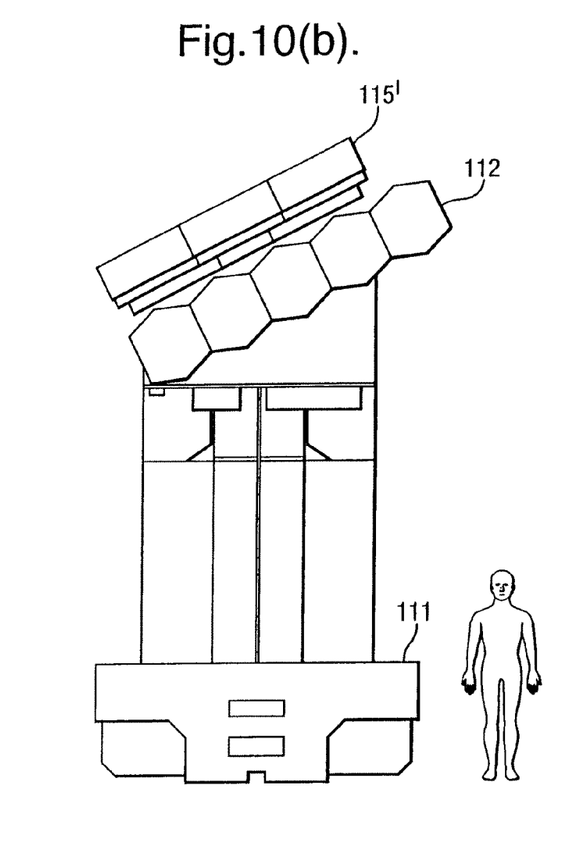

FIGS. 10(*a*) and 10(*b*) provide a direct schematic comparison of two payload configurations as applied to the same space mission, FIG. 10(*a*) showing a Geo-mobile payload 110 conventionally configured on a typical platform 111, and FIG. 10(*b*) showing how five interconnected faceted tubes 112 (with functional unit), of the type described previously in FIG. 7, can be effectively configured as payload modules on the same platform 111 as in FIG. 10(*a*).

As shown in the conventional structure of FIG. 10(*a*), the payload is distributed across the entire wirewall of the structure 110. Note that, in this case, the feed 115 is mounted at the top end of the structure 110.

In contrast, as shown in the inventive structure of the embodiment of FIG. 10(*b*), the payload is effectively distributed in close packed formation across the five faceted tubes 112, with the associated feed 115' being proximately mounted above. Thus, because there is such an effective close packing of payload equipments (functional units) in this structure, it is possible to provide a compact, yet robust three-dimensional payload module structure for supporting complete payloads. Note in this connection the marked reduction in size of structure in going from that of FIG. 10(*a*) to that of FIG. 10(*b*). For sake of clarity of the Figures, a man is also shown for scale.

Figure 11:
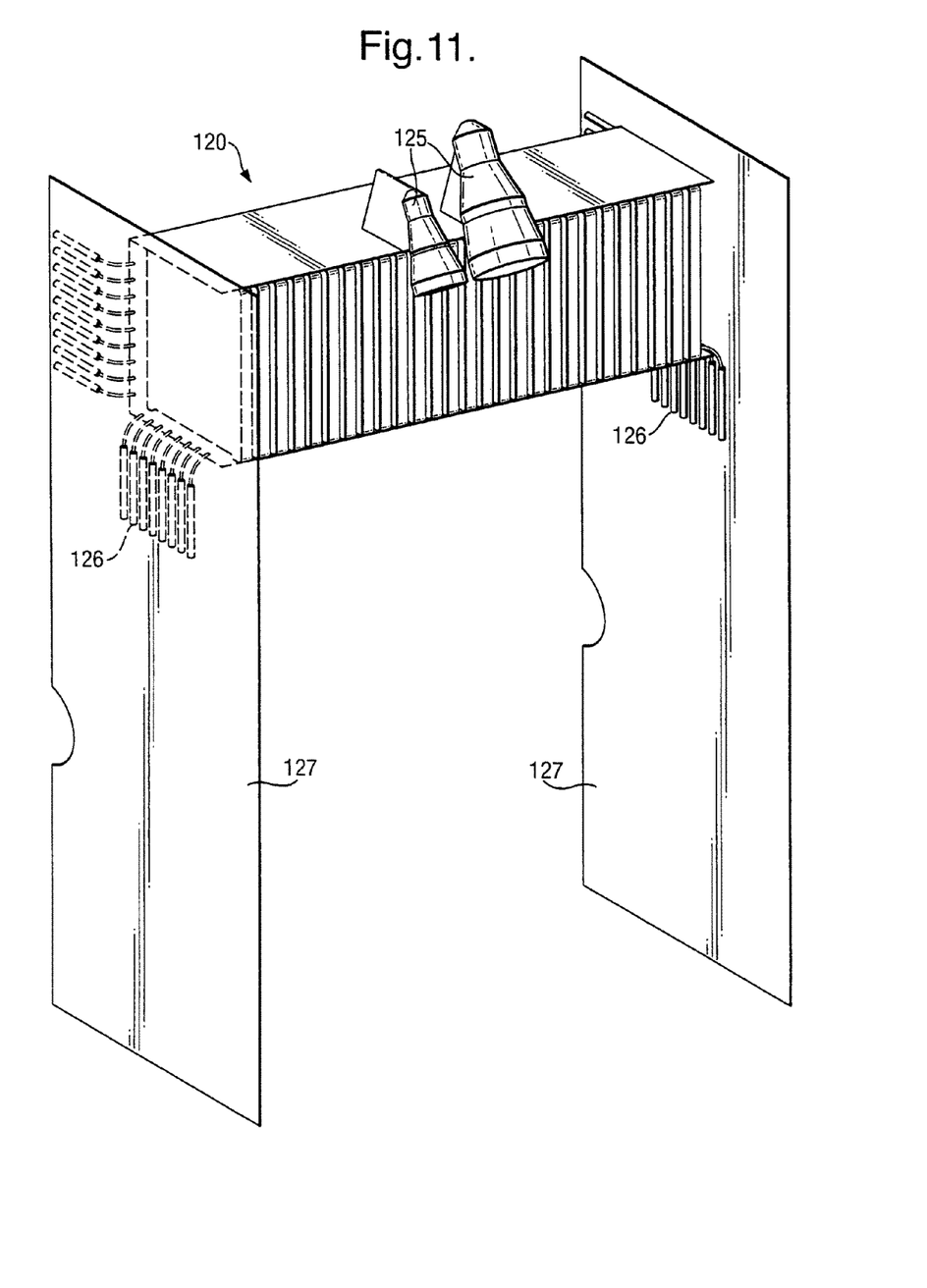
FIG. 11 is a perspective view of an assembly of rack-mounted payload equipments which provide a payload module in accordance with another embodiment of the present invention.

FIG. 11 shows, as a perspective view, an assembly of racked-mounted payload equipments (all of standard size) which provide a payload module 120 in accordance with another embodiment of the present invention.

As shown, the rack-mounted module 120 with chassis has a rectangular box-type configuration which is formed to define an interior volume space for receiving a plurality of functional units. The units could be in the form of printed circuit boards, for example. In use, therefore, it is envisaged that two or more units can be slidably mounted, side by side, onto the rack-mounting chassis. The chassis is formed of suitable (aluminium, for example) material. In this way, a linear array of units can be housed by the module 120, if so desired.

As also shown, the associated feed in the form of two feed horns 125 is mounted on top directly to the module structure 120. Its actual position will depend upon the particular antenna geometry. It will be understood that an effective heat transfer mechanism with temperature compensation means for regulating temperature differentials between components of the module structure can be readily provided, and the Figure shows one way of accomplishing this—more particularly, the Figure shows how the heat pipe interfaces 126 could be disposed between module 120 and radiator panels 127.

Having thus described the present invention by reference to various preferred embodiments, it is to be appreciated that the embodiments are in all respects exemplary and that modifications and variations are possible without departure from the spirit and scope of the invention. For example, whilst in the described embodiment of FIG. 7 the faceted tube has a regular octagonal structure, the tube could alternatively, for example, have an irregular different polygonal structure, or a circular structure, or an oval structure or an altogether different squashed structure if desired, provided that there are facets of sufficient size and number for the functional units and for adequate structural support. Further, whilst only two separate faceted tubes are described in relation to the FIG. 9 embodiment, the described arrangement could be modified by provision of additional faceted tubes for example, if desired, and by corresponding modification of the support structure, if desired. Further, whilst in the described embodiment of FIG. 10(b) there are five coupled faceted tubes, the arrangement could be readily modified to accommodate less or more coupled faceted tubes, if desired. Furthermore, whilst in the described embodiment of FIG. 11, the functional units are separately mounted onto the rack-mounting chassis, it is equally possible for the units to be formed as an integral part of the payload module, if desired.

It is to be also appreciated that any payload module structure formed by adjoining two or more functional units with non-planar interconnects falls within the scope of this invention.

It is to be also appreciated that the inventive payload module structure finds utility in various space-based applications as well as in various terrestrial applications, for example in radar/airborne communications systems, as well as in optical/quasi-optical systems.

It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims.

The invention claimed is:

1. A payload apparatus for supporting a number of interconnected functional units, said units arranged to provide a sufficient closely-packed modular formation occupying a predetermined volume, said interconnected functional units comprising at least one dissipative element, said apparatus comprising:
a non-planar supporting structure for mechanically supporting said interconnected functional units;
a number of thermal radiators positioned remotely in relation to the position of the supporting structure; and
means for defining a thermal pathway between said at least one dissipative element and said number of thermal radiators wherein dissipated heat is transported from said at least one dissipative element to said number of thermal radiators via the thermal pathway, wherein said non-planar supporting structure comprises a faceted tubular body for receiving the units.

2. A payload apparatus as claimed in claim 1, including feed means for converting electrons into photons or vice versa.

3. A payload apparatus as claimed in claim 2, further including functional units mounted at different predetermined locations on a plurality of inner faces of the faceted body and wherein associated feed locations are mounted in proximate relationship to the functional units at different predetermined locations on corresponding external faces of the faceted tubular body.

4. A payload apparatus as claimed in claim 1, further including eight functional units arrayed in an octagon around an opening defined by the faceted body.

5. A payload apparatus as claimed in claim 1 wherein the means for defining a thermal pathway includes temperature compensation means.

6. A payload apparatus as claimed in claim 5 wherein said temperature compensation means includes a number of heat pipes for gathering heat dissipated by the functional units and circuitry responsive to the output of dissipated heat for adjusting temperature differences between the functional units.

7. A spacecraft vehicle or satellite incorporating a payload apparatus as claimed in claim 1.

8. A payload apparatus as claimed in claim 1 wherein the means for defining a thermal pathway includes a number of heat pipes for gathering heat dissipated by the functional units and circuitry responsive to the output of dissipated heat for adjusting temperature differences between the functional units wherein the functional units are mounted to said heat pipes aligned along the tube length on internal faces of the tube.

9. A payload apparatus as claimed in claim 8 wherein heat transfer from the tube mounted heat pipes to the remote radiators is carried out by one of a direct connection and an indirect connection using a fluid loop.

10. A spacecraft vehicle or satellite incorporating a payload apparatus as claimed in claim 1, including thermal radiators facing in the north and south directions and wherein a longitudinal axis of the faceted tube structure is parallel to a north/south axis of the satellite.

11. A spacecraft vehicle or satellite according to claim 10, wherein the means for defining a thermal pathway includes a number of heatpipes for gathering heat dissipated by the functional units and the heatpipes are L-shaped with a longer part of the heatpipe bolted to the banks of functional units within the tube and the other arm of the heatpipe bolted directly to one or other of the north and south radiators.

12. A spacecraft vehicle or satellite according to claim 10, wherein the faceted tubular body includes two separate faceted tubes in which each is structurally supported by a platform of the spacecraft vehicle or satellite so as to be positioned directly on top of one of the north/south facing radiator panels.

13. A spacecraft vehicle or satellite according to claim 10, wherein the payload is distributed in close packed formation across a number of faceted tubes with associated feed being proximately mounted above the tubes.

14. A payload apparatus for supporting a number of interconnected functional units, said units arranged to provide a sufficient closely-packed modular formation occupying a predetermined volume, said interconnected functional units comprising at least one dissipative element, said apparatus comprising:
a non-planar supporting structure for mechanically supporting said interconnected functional units;
a number of thermal radiators positioned remotely in relation to the position of the supporting structure; and
means for defining a thermal pathway between said at least one dissipative element and said number of thermal radiators wherein dissipated heat is transported from said at least one dissipative element to said number of thermal radiators via the thermal pathway, said supporting structure comprising a rack-mounting chassis.

15. A payload apparatus as claimed in claim 14 wherein a receiving volume space is defined by the chassis to accommodate a linear array of functional units, each of the units being slidably mounted on the chassis.

* * * * *